United States Patent [19]
Takeuchi et al.

[11] Patent Number: 5,914,653
[45] Date of Patent: Jun. 22, 1999

[54] START CONTROLLING SYSTEM FOR A PASSENGER PROTECTION SYSTEM, AND RECORDING MEDIUM FOR RECORDING COMPUTER-READABLE INSTRUCTIONS

[75] Inventors: Kunihiro Takeuchi; Yasumasa Kanameda, both of Tomioka, Japan

[73] Assignee: Airbag Systems Co., Ltd., Gunma, Japan

[21] Appl. No.: 09/184,229

[22] Filed: Nov. 2, 1998

[30] Foreign Application Priority Data

Mar. 19, 1998 [JP] Japan .................................. 10-89587

[51] Int. Cl.⁶ .................................................. B60Q 1/00
[52] U.S. Cl. ...................... 340/436; 280/731; 280/734; 280/728.1
[58] Field of Search ............................ 340/436; 280/731, 280/734, 728.1

[56] References Cited

U.S. PATENT DOCUMENTS

| | | | |
|---|---|---|---|
| 5,382,049 | 1/1995 | Hiramitsu et al. | 280/735 |
| 5,440,485 | 8/1995 | Okimoto et al. | 340/436 |
| 5,484,166 | 1/1996 | Mazur et al. | 280/735 |
| 5,555,174 | 9/1996 | Okimoto et al. | 340/436 |
| 5,620,202 | 4/1997 | Gray et al. | 280/735 |
| 5,746,444 | 5/1998 | Foo et al. | 280/735 |
| 5,758,899 | 6/1998 | Foo et al. | 280/730.2 |
| 5,801,619 | 9/1998 | Liu et al. | 340/436 |

*Primary Examiner*—Jeffery A. Hofsass
*Assistant Examiner*—Toan N. Pham
*Attorney, Agent, or Firm*—Wenderoth, Lind & Ponack, L.L.P.

[57] ABSTRACT

If the impact acceleration G which exceeds the predetermined threshold value $G_{TH}$ is detected within a predetermined time (see step 124 in FIG. 2) after the speed integral value $\Delta V$ which exceeds the predetermined threshold value $V_{TH}$ has been detected (see step 112 in FIG. 2), it is decided that such impact acceleration is caused by the underfloor interference or the seat slide and therefore the side air bag system is not started (see step 126 in FIG. 2). In contrast, if the impact acceleration G which exceeds the predetermined threshold value $G_{TH}$ is not detected within the predetermined time (see step 124 in FIG. 2) after the speed integral value $\Delta V$ which exceeds the predetermined threshold value $V_{TH}$ has been detected (see step 112 in FIG. 2) it is decided that such impact acceleration is caused by the true clash and therefore the side air bag system is started (see step 120 in FIG. 2).

7 Claims, 4 Drawing Sheets

START CONTROLLING SYSTEM FOR A PASSENGER PROTECTION SYSTEM, AND RECORDING MEDIUM FOR RECORDING COMPUTER-READABLE INSTRUCTIONS

BACKGROUND OF THE INVENTION

1. Field of the Invention

The present invention relates to start control in a passenger protection system for achieving protection of passengers in clash of a vehicle and, more particularly, an improvement in the start control for a passenger protection system which intends to protect the passenger by sensing a side clash of the vehicle.

2. Description of the Related Art

In the field of the so-called air bag system which is representative of the passenger protection system, in addition to the air bag system which can protect mainly the passenger from the frontal clash, recently so-called various side air bag systems which can protect the passenger from the side clash of the vehicle have been proposed, and some of them have been employed in practical use.

In most of the side air bag systems which have been proposed up to now in this country, units being called ECUs (Electrical Control Units) for controlling the side air bag system are installed in so-called B pillars provided substantially on the boundary areas between the front doors and the rear doors of the four door vehicle. However, in this manner, in the case of the configuration in which the ECUs are provided in the B pillars, the ECUs are needed so as to correspond to the number of the requested air bag system. For example, if the driver should be protected from the side clash of the driver's seat and simultaneously the passenger should be protected from both side clashes of the rear seat, the ECUs are provided in right and left B pillars respectively. In this case, two ECUs are needed in total. Two ECUs of the side air bag systems are then connected to a unit called a center ECU. Because this center ECU is provided in the center area of the vehicle, for example, cable connection between the center ECU and two ECUs are needed. As a result, such disadvantages are brought about that the configuration becomes complicated and cost of the vehicle becomes higher.

In order to overcome the above disadvantages, it has been examined that the ECUs for a plurality of side air bag systems are arranged at or near the location where the center ECU is arranged (so-called single point arrangement). In such case, various following problems must be overcome.

More particularly, normally the center ECU is often provided near the center area of the vehicle. Therefore, if the ECUs for the side air bag systems are arranged in vicinity of the center ECU, they are positioned remote from the side surfaces of the vehicle. As a result, sensors which are provided together with the ECUs for the side air bag systems to detect the impact acceleration caused by the side clash are also positioned remote from the side surfaces of the vehicle. Thus, the problem has arisen that a detection sensitivity of the impact acceleration is decreased. Hence, the counterplans such that the sensitivity of the sensor per se is increased, the detection sensitivity in the software process by the ECU is increased, etc. are requested.

However, in the event that the sensitivity of the sensor per se is increased, the detection sensitivity in the software process by the ECU is increased, etc., such counterplans cannot be implemented not to bring about new another problems. In other words, enhancement of such detection sensitivity means that the impacts generated due to various causes other than the clash are detected by the acceleration sensor as the impact acceleration.

For example, the impact being caused by so-called underfloor interference (resonance of the floor, etc.) during traveling of the vehicle, the impact being caused by so-called seat slide (movement of the seat), or the like can be caught by the acceleration sensor. Therefore, such a new problem has arisen that there is a possibility that these impacts exceed the threshold value to decide start of the side air bag systems to thus cause the false decision. As a result, a countermeasure to avoid the possibility of such false decision must be further applied.

SUMMARY OF THE INVENTION

It is an object of the present invention to provide a start controlling method for a passenger protection system, which is able to achieve so-called single point arrangement of a side air bag system without false decision on impacts which are caused by the event, e.g., so-called underfloor interference, seat slide, etc. other than proper collision or clash, a start controlling system for the passenger protection system, and a recording medium for recording a plurality of computer readable instructions.

It is another object of the present invention to provide a start controlling method for a passenger protection system, which is able to distinguish the impact caused by the event except for the clash from the impact caused by the clash without fail and also have high reliability, a start controlling system for the passenger protection system, and a recording medium for recording a plurality of computer readable instructions.

In order to achieve the above objects, according to a first aspect of the present invention, there is provided a start controlling method of controlling start of a passenger protection system which is constructed to start a protection system which protects a passenger in a vehicle in response to a start signal applied externally, comprising the steps of:

executing a time integration of an impact acceleration being detected;

deciding whether or not a time integral value of the impact acceleration exceeds a first predetermined value;

deciding whether or not an impact acceleration which exceeds a second predetermined value is detected within a predetermined time when it has been decided that the time integral value of the impact acceleration exceeds the first predetermined value; and disabling start of the passenger protection system if it has been decided by execution of above step that the impact acceleration exceeds the second predetermined value within the predetermined time, while executing the start of the passenger protection system if it has been decided by execution of above step that the impact acceleration does not exceed the second predetermined value within the predetermined time.

Such start controlling method is made to take account of the fact that certain correlations between the level and timing and the speed integral value ΔV of the impact acceleration are established when the resonance of floor, etc. of the vehicle caused by the causes except the clash is detected by the acceleration sensor as the impact acceleration, or when the impact due to movement of the seat is detected by the acceleration sensor as the impact acceleration. In other words, the inventors of the present invention have examined earnestly the relationship between the impact acceleration and the time integral value. As a result, the inventors of the present invention find out the fact, if the impact acceleration which is caused by the causes other than the clash and decided erroneously as the clash is detected, the impact acceleration which exceeds the second predetermined value can be detected within the predetermined time after the time integral value of the impact acceleration has exceeded the first predetermined value.

According to this start controlling method, if the impact acceleration exceeds the second predetermined value within the predetermined time after the time integral value of the impact acceleration has exceeded the first predetermined value, it is decided that the clash does not occur and therefore the passenger protection system is not started. In contrast, if the impact acceleration does not exceed the second predetermined value within the predetermined time after the time integral value of the impact acceleration has exceeded the first predetermined value, it is decided that the true clash occurs and therefore the passenger protection system is started. As a result, the situation in which false decision of the impact caused by the underfloor interference or the seat slide other than the true clash is made can be eliminated.

In order to achieve the above objects, according to a second aspect of the present invention, there is provided a start controlling system for controlling start of a passenger protection system which is constructed to start a protection system for protecting a passenger in a vehicle in response to a start signal applied externally, comprising:

an integrating means for calculating a time integral value of a impact acceleration being input externally;

an integral value deciding means for deciding whether or not the value calculated by the integrating means exceeds a first predetermined value;

a clash deciding means for deciding whether or not an impact acceleration which exceeds a second predetermined value is detected within a predetermined time when it has been decided by the integral value deciding means that the value calculated by the integrating means exceeds the first predetermined value; and a start signal generating means for generating a start signal to the passenger protection system if it has been decided by the clash deciding means that the impact acceleration does not exceed the second predetermined value within the predetermined time, while disabling generation of the start signal to the passenger protection system if it has been decided by the clash deciding means that the impact acceleration exceeds the second predetermined value within the predetermined time.

The start controlling system for controlling start of the passenger protection system is constructed especially to control start of the passenger protection system by the start controlling method of controlling start of a passenger protection system set forth in claim 1. The integrating means, the integral value deciding means, the clash deciding means, and the start signal generating means can be implemented by causing the CPU to execute the predetermined program, for example.

In order to achieve the above objects, according to a third aspect of the present invention, there is provided a start controlling system for controlling start of a passenger protection system which is constructed to start a protection system for protecting a passenger in a vehicle in response to a start signal applied externally, comprising:

a first interface portion for converting an output of an acceleration sensor into a predetermined signal format;

a first storing portion for storing a program to control start of the passenger protection system;

a central processing unit for executing the program being stored in the first storing portion, the central processing unit calculates a time integral value of an impact acceleration being input via the first interface portion, then decides whether or not the time integral value of the impact acceleration being calculated exceeds a first predetermined value, then decides whether or not the impact acceleration which exceeds a second predetermined value is detected within a predetermined time when it has been decided that the time integral value of the impact acceleration exceeds the first predetermined value, and then generates a start signal to the passenger protection system when it has been decided that the impact acceleration which exceeds the second predetermined value is not detected, while disables the start signal to the passenger protection system when it has been decided that the impact acceleration which exceeds the second predetermined value is detected; and a second interface portion for converting the start signal to the passenger protection system, which is output from the central processing unit, into a predetermined signal format which can be input into the passenger protection system, and then outputting it.

In the preferred embodiment of the present invention, the first predetermined value is at a level of the time integral value of the impact acceleration which decides that the passenger protection system must be started.

In the preferred embodiment of the present invention, decision whether or not the time integral value of the impact acceleration exceeds the first predetermined value is made by using respective absolute values, then it is decided that the time integral value of the impact acceleration exceeds the first predetermined value if the absolute value of the time integral value of the impact acceleration becomes larger than the absolute value of the first predetermined value, the second predetermined value has the positive polarity, and a sign of the second predetermined value is inverted if the time integral value of the impact acceleration to be compared with the first predetermined value has a positive value, and it is decided that the impact acceleration which exceeds the second predetermined value is detected if the impact acceleration which is larger than the second predetermined value whose sign is inverted is detected.

In order to achieve the above objects, according to a fourth aspect of the present invention, there is provided a recording medium for recording a plurality of computer-readable instructions, comprising:

a first instruction means for causing a computer to execute time integral of an impact acceleration which is input into the computer;

a second instruction means for causing a computer to decide whether or not a time integral value of the impact acceleration exceeds a first predetermined value;

a third instruction means for causing a computer to decide whether or not an impact acceleration which exceeds a second predetermined value is detected within a predetermined time when it has been decided that the time integral value of the impact acceleration exceeds the first predetermined value; and a fourth instruction means for causing a computer to disable start of the passenger protection system if it has been decided by execution of above step that the impact acceleration exceeds the second predetermined value within the predetermined time, while to execute the start of the passenger protection system if it has been decided by execution of above step that the impact acceleration does not exceed the second predetermined value within the predetermined time.

DETAILED DESCRIPTION OF THE PREFERRED EMBODIMENTS

Embodiments of the present invention will be explained in detail with reference to the accompanying drawings hereinafter.

Members, arrangement, etc. explained in the following should not be interpreted to limit to the present invention, and therefore may be varied and modified variously within the scope of the present invention.

To begin with, a basic configuration of a start controlling system for a passenger protection system according to an embodiment of the present invention (referred to as "present system" hereinafter) will be explained with reference to FIG. 1.

Figure 1:
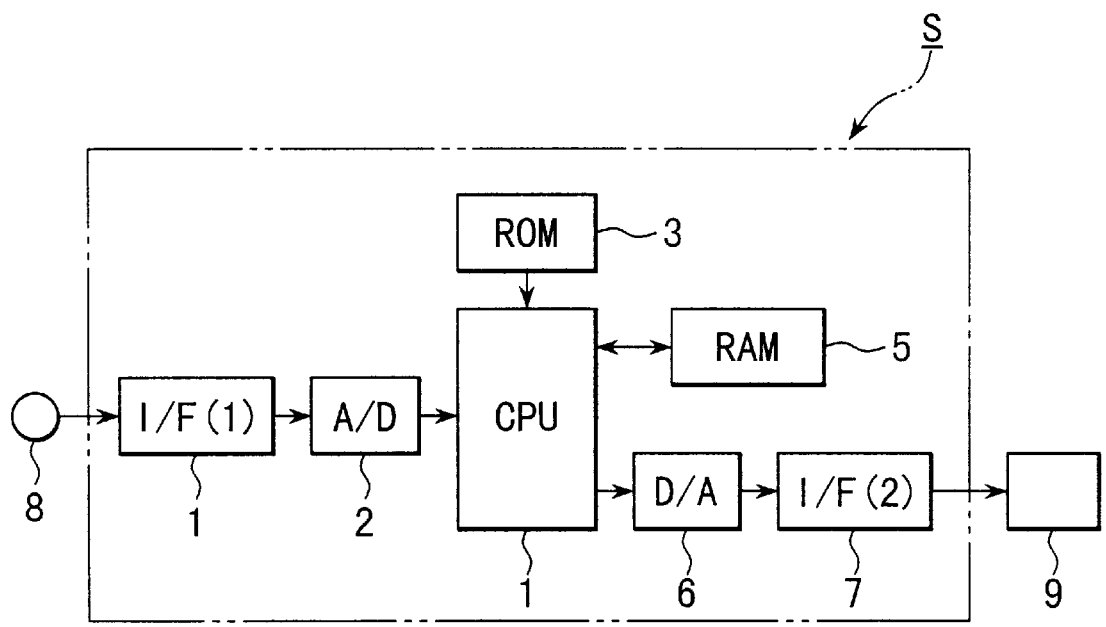
FIG. 1 is a view showing an example of a configuration of a start controlling method for a passenger protection system according to an embodiment of the present invention.

As shown in FIG. 1, a so-called hardware configuration of the present system S comprises a first interface circuit (labeled as an "I/F (1)" in FIG. 1) 1 for executing a level conversion of an output signal of an acceleration sensor 8, an analogue/digital converter (labeled as an "A/D" in FIG. 1) 2 for converting an analogue signal input via the first interface circuit 1 into a digital signal, a ROM (Read Only Memory) 3 into which a program for executing a start controlling operation to be described later is stored, a central processing unit (CPU) 4 for controlling an operation of the present system S described later, a RAM (Random Access Memory) 5 into/from which arithmetic results, etc. by the central processing unit 4 are stored/read, a digital/analogue converter (labeled as an "D/A" in FIG. 1) 6 for converting a digital control signal being output from the central processing unit 4 into an analogue control signal, and a second interface circuit (labeled as an "I/F (2)" in FIG. 1) 7 for establishing an interface with a so-called side air bag system 9 as a passenger protection system.

Then, a first interface portion is composed of the first interface circuit 1 and the analogue/digital converter 2, a first storing portion is composed of the ROM 3, and a second interface portion is composed of the second interface circuit 7 and the digital/analogue converter 6.

Normally, as the representative acceleration sensor, there are a semiconductor type sensor, a piezoelectric type sensor, etc. But the acceleration sensor 8 of the present system S is not limited to particular type, and any type of sensor may be employed.

The central processing unit 4 is composed of a so-called well known CPU formed as IC, for example, which has a function as a so-called microcomputer. This central processing unit 4 may be constructed by a DSP (Digital Signal Processor) which is known as an integrated circuit to enable high speed processing.

The side air bag system 9 consists of an inflator (gas generator) (not shown) and an air bag main body. This side air bag system 9 is a well known system in which a gas is generated by the inflator to inflate the air bag main body.

Next, a basic conception of start control in the embodiment of the present invention will be explained with reference to FIGS. 3A and 3B, prior to explanation of procedures of particular start control by the central processing unit 4.

To begin with, the start control in the embodiment of the present invention is executed to prevent following fault decision. More particularly, in case single point arrangement is installed by arranging the present system S, which acts as a so-called ECU of the side air bag system 9, in or close to a so-called center ECU (not shown), which performs functions for managing control of overall electronic control of the vehicle, etc., a phenomenon which is the problem in the prior art, i.e., false clash decision caused when the acceleration sensor 8 detects the resonance of floor, etc. of the vehicle (or the impact generated by so-called seat slide) by the cause other than the clash applied from the outside of the vehicle should be prevented.

The inventors of the present invention have examined earnestly a relationship between an impact acceleration generated when the above resonance of floor (or seat slide) is caused to thus make the false decision, as it is, and a speed integral value $\Delta V$ which is a time integral value. As a result, the inventors of the present invention find out a following correlation between the impact acceleration and the speed integral value $\Delta V$.

Figure 3A:
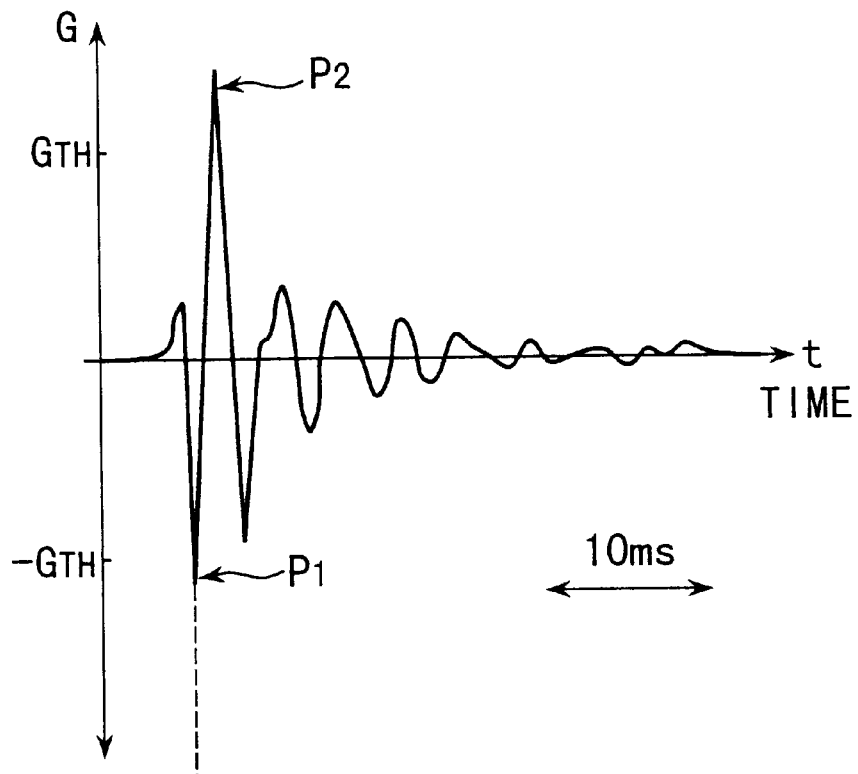
FIG. 3A is a view showing a characteristic curve indicating change in impact acceleration if it is decided that the clash is not caused in the start control in the embodiment of the present invention.

More particularly, if the floor, etc. of the vehicle are resonated by the cause other than the clash, a following phenomenon is noted, as shown in FIG. 3A, for example. That is, the impact acceleration which is almost equivalent to or in excess of the acceleration detected in actual clash, i.e., so-called impact acceleration, is detected by the acceleration sensor (see a point indicated by a reference P1 in FIG. 3A), then the impact acceleration which is almost equivalent to or in excess of the previously detected impact acceleration is generated in the reverse direction after a relatively short period (e.g., about 5 msec) (see a point indicated by a reference P2 in FIG. 3A), and then such impact acceleration is attenuated gradually.

Figure 3B:
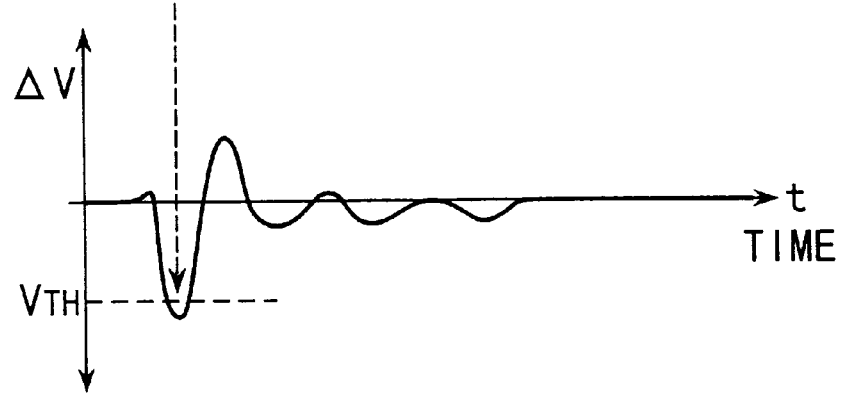
FIG. 3B is a view showing a characteristic curve indicating change in speed integral value which is time integral of the impact acceleration shown in FIG. 3A.

In contrast, when the so-called speed integral value $\Delta V$ which is a time integral value of the above impact acceleration is detected, normally such speed integral value $\Delta V$ has a magnitude to exceed a predetermined threshold value $V_{TH}$ near the area in which the first large impact acceleration is generated (point indicated by the reference P1 in FIG. 3A), as shown in FIG. 3B. If the speed integral value $\Delta V$ exceeds the threshold value $V_{TH}$, it is decided that the side air bag system 9 must be started. Nevertheless, since the large impact acceleration which has the opposite direction to the previous impact acceleration (point indicated by the reference P2 in FIG. 3A) is generated thereafter, the speed integral value $\Delta V$ does not have the magnitude to exceed the predetermined threshold value $V_{TH}$.

The start control in the embodiment of the present invention has been thought out based on the fact that, as described above, when the resonance of floor, etc. (or seat slide) is caused, a certain correlation can be established between a level and timing of the impact acceleration being detected and the speed integral value ΔV. In other words, if it is decided that such correlation has been established, start of the side air bag system 9 is not carried out even when the speed integral value ΔV exceeds the predetermined threshold value $V_{TH}$. On the contrary, if it is decided that such correlation has not been established, start of the side air bag system 9 is carried out in the same way as previously arranged when the speed integral value ΔV exceeds the predetermined threshold value $V_{TH}$.

Figure 2:
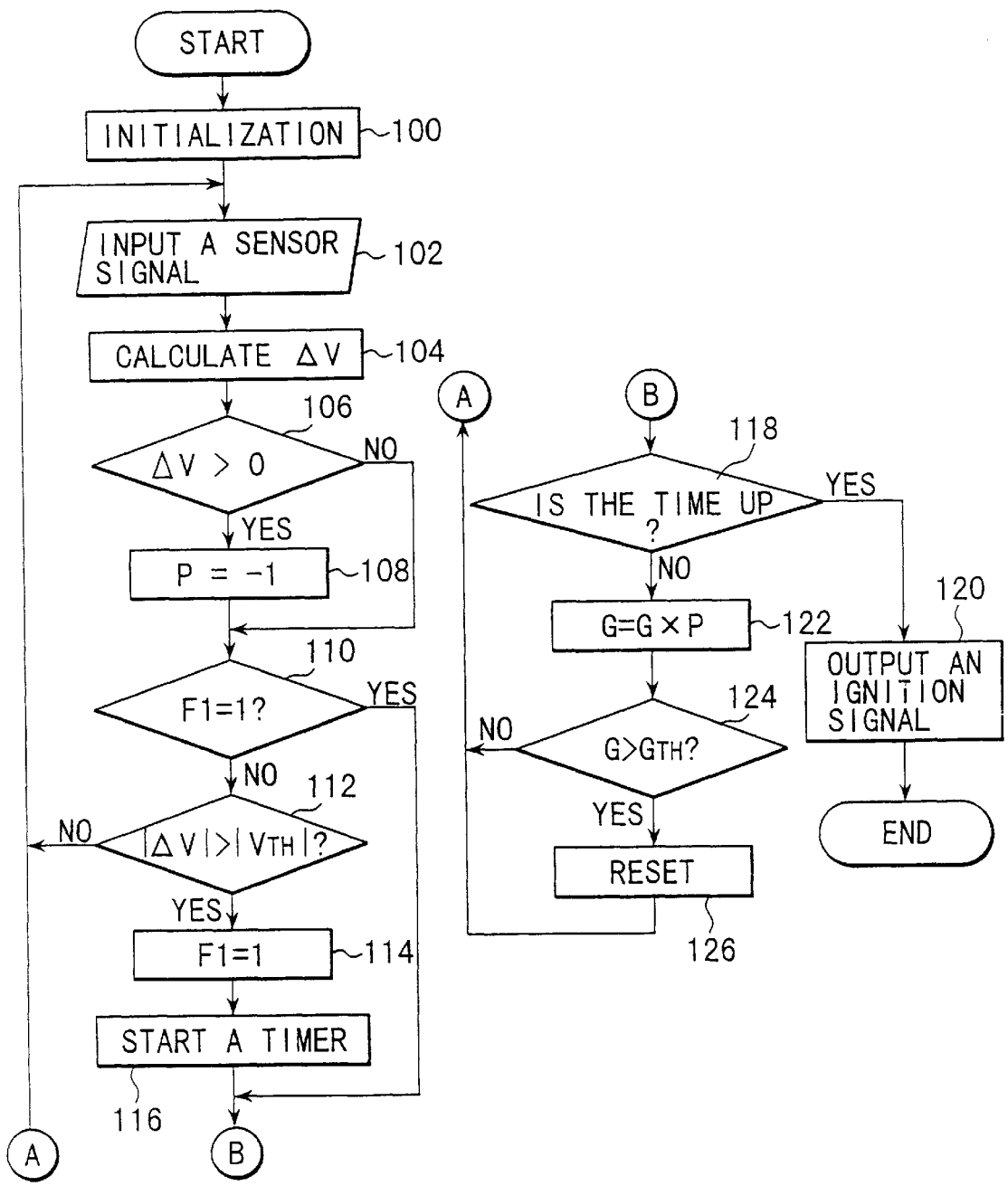
FIG. 2 is a flowchart showing procedures in start control executed by a CPU constituting the start controlling method for the passenger protection system shown in FIG. 1.

A flowchart illustrating procedures in the start control executed by the central processing unit 4 is shown in FIG. 2. Then, the start control of the side air bag system 9 executed by the central processing unit 4 will be explained in more detail with reference to FIG. 2 hereinbelow.

When an operation of the central processing unit 4 is started, initialization of various variables, flags, etc. are effected first (see step 100 in FIG. 2). For example, an inverter variable P described later is set to "1" and a state decision flag F1 is set to "0".

Then, the impact acceleration of the vehicle detected by the acceleration sensor 8 is input into the central processing unit 4 via the first interface circuit 1 and the analogue/digital converter 2 (see step 102 in FIG. 2).

Then, the impact acceleration being input as above is integrated relative to time, and thus the speed integral value ΔV is calculated (see step 104 in FIG. 2).

Then, the process advances to step 106 wherein it is decided whether or not the calculated speed integral value ΔV exceeds zero. If it is decided that the speed integral value ΔV exceeds zero (if YES), the inverter variable P is set to "−1" (see step 108 in FIG. 2). Then, the process advances to step 110 described later.

In contrast, in step 106, if it is decided that the speed integral value ΔV does not exceed zero (if NO), i.e., if the calculated speed integral value ΔV has negative polarity, the process advances to step 110 without execution of step 108 (see step 106 in FIG. 2).

As explained previously with reference to FIGS. 3A and 3B, there are two cases where the speed integral value ΔV having the same magnitude as the clash appears when the resonance of the floor, etc. of the vehicle is caused by the cause other than the clash. That is, one case where, as shown in FIG. 3B, the large speed integral value ΔV with negative polarity is generated first in answer to appearance of the impact acceleration, and the other case where conversely the large speed integral value ΔV with positive polarity is generated first (in this case, it is of course that the impact acceleration with positive polarity is generated first, in contrast to the example of the impact acceleration shown in FIG. 3A). The inverter variable P is employed to change the polarity of the impact acceleration, as described later, such that a predetermined threshold value $G_{TH}$ can be applied commonly to the positive value even if the impact acceleration has any of positive and negative polarities. Such predetermined threshold value $G_{TH}$ acts as a criterion to decide the magnitude of the impact acceleration generated later, according to the polarities of the first impact acceleration and the first speed integral value ΔV.

In step 110, it is decided whether or not the state decision flag F1 has been set to "1" (see step 110 in FIG. 2).

Then, if it is decided that the state decision flag F1 has been set to "1" (if YES), the process advances to step 118 described later. In contrast, if it is decided that the state decision flag F1 has not been set to "1" (if NO), the process advances to step 112. In step 112, it is decided whether or not an absolute value of the speed integral value ΔV exceeds an absolute value of the predetermined threshold value $V_{TH}$ (see step 112 in FIG. 2).

In step 112, if it is decided that the absolute value of the speed integral value ΔV does not exceed the absolute value of the predetermined threshold value $V_{TH}$ (if No), it is decided that, as explained previously with reference to FIGS. 3A and 3B, the resonance of floor, etc. of the vehicle is not generated by the cause other than the clash and then the process returns to step 102. Then, a series of above processes will be repeated once gain. Where normally the predetermined threshold value $V_{TH}$ is set at such a level of the speed integral value ΔV that is decided when the side clash occurs to request start of the side air bag system 9 (see FIG. 3B).

Meanwhile, if it is decided that the absolute value of the speed integral value ΔV exceeds the absolute value of the predetermined threshold value $V_{TH}$ (if YES), the state decision flag F1 is set to "1" (see step 114 in FIG. 2). Then, a timer for measuring a time is started (see step 116 in FIG. 2). This timer can count a lapse time from the start of the timer according to the well known software process. The state decision flag F1 is set to "1" when the speed integral value ΔV exceeding the predetermined threshold value $V_{TH}$ is detected. The state decision flag F1 is kept at "1" until it is decided that generation of the speed integral value ΔV is caused by either the true clash or the resonance of floor, etc. of the vehicle generated by the cause other than the clash (or seat slide).

Then, in step 118, it is decided whether or not a predetermined time has been lapsed after the start of the timer (the time is up). If it is decided that the predetermined time has been lapsed (if YES), then it is decided that the start of the side air bag system 9 is needed and then an ignition signal is output to the side air bag system 9 (see step 120 in FIG. 2). Thus, a series of processes are terminated. More particularly, this means that the impact acceleration having the opposite polarity to the impact acceleration to cause the speed integral value ΔV has not been detected in a predetermined period of time, e.g., about 5 msec, after the speed integral value ΔV exceeding the predetermined threshold value $V_{TH}$ has been detected. In this case, it is decided that, as explained previously with reference to FIGS. 3A and 3B, the resonance of floor, etc. of the vehicle is not generated by the cause other than the clash but the true clash occurs, and therefore the side air bag system 9 must be started.

In contrast, in step 118, if it is decided that the predetermined time has not been lapsed yet (if NO), a new impact acceleration G which is derived by multiplying the impact acceleration G at this point of time by the value of the inverter variable P is set (see step 122 in FIG. 2).

The reason of that the impact acceleration G detected by the acceleration sensor 8 is multiplied by the value of the inverter variable P can be given as follows.

At first, as explained previously with reference to FIGS. 3A and 3B, after the absolute value of the speed integral value ΔV has exceeded the absolute value of the predetermined threshold value $V_{TH}$ because of the cause other than the clash, sometimes the impact acceleration having the magnitude to exceed the predetermined value appears within the predetermined period of time. But the polarity of such impact acceleration which appears within the predetermined period of time is different based on the polarity of the first large impact acceleration. In other words, if the first large impact acceleration is on the positive side, the impact acceleration to be measured subsequently is on the negative side. On the contrary, if the first large impact acceleration is on the negative side, the impact acceleration to be measured next is on the positive side.

Meanwhile, the predetermined threshold value $G_{TH}$ which acts as the criterion to decide whether or not the impact acceleration exceeds the predetermined magnitude is set previously to a predetermined positive value. Therefore, in order to enable employment of the predetermined threshold value $G_{TH}$ regardless of the polarity of the detected impact acceleration, the impact acceleration G is converted into a positive numerical value by multiplying P=−1 if such impact acceleration G has the negative polarity. More particularly, assume that, because of the cause other than the clash, it is decided that the speed integral value ΔV exceeds zero in above step 106, then P=−1 is set in step 108, then it is decided that |ΔV|>|V$_{TH}$| (see step 112 in FIG. 2) and then the large impact acceleration is generated, the impact acceleration has a negative value (see FIGS. 3A and 3B). However, since "−1" is multiplied in step 122, such impact acceleration is converted into a positive value.

Then, assume that it is decided that the speed integral value ΔV does not exceed zero in above step 106, then it is decided that |ΔV|>|V$_{TH}$| (see step 112 in FIG. 2), and then the large impact acceleration is generated, the impact acceleration has a positive value (see FIGS. 3A and 3B). In this case, since P is still the initially set value as it is, i.e., P=1, its polarity is not changed by the multiplication in step 122 and kept as it is.

Returning to explanation in FIG. 2 once again, after the process in step 122 has been completed as described above, it is decided whether or not the impact acceleration G exceeds the predetermined threshold value $G_{TH}$ (see step 124 in FIG. 2).

Then, if it is decided whether or not the impact acceleration G exceeds the predetermined threshold value $G_{TH}$ (if YES), it is decided that the clash of the vehicle is not caused but the resonance of floor, etc. of the vehicle (or seat slide) is caused by the caused other than the clash, and thus various variables, flags, etc., are reset into their initial states (see step 126 in FIG. 2). The process returns to above step 102 and then a series of above processes are repeated once again.

In contrast, in step 124, if it is decided whether or not the impact acceleration G does not exceed the predetermined threshold value $G_{TH}$ (if NO), the process advances to above step 102 since it cannot decided that the above resonance of floor, etc. of the vehicle (or seat slide) is generated by the cause other than the clash. Then, a series of above processes are repeated.

In the above embodiment of the present invention, an integrating means can be implemented by executing step 104 (see FIG. 2) by the central processing unit 4, an integral value deciding means can be implemented by executing step 106 (see FIG. 2) by the central processing unit 4, a clash deciding means can be implemented by executing steps 118, 122, 124 (see FIG. 2) by the central processing unit 4, and a start signal generating means can be implemented by executing steps 120, 126 (see FIG. 2) by the central processing unit 4.

In the above embodiment of the present invention, in decision of the magnitude of the impact acceleration (see step 124 in FIG. 2), in order to use the predetermined threshold value $G_{TH}$ serving as a criterion of decision as the positive value fixedly irrespective of the polarity of the impact acceleration G, the impact acceleration G is con-verted into the positive value by multiplying "−1" if such impact acceleration G has the negative value (see steps 106, 108, 122 in FIG. 2). The decision of the magnitude of the impact acceleration G should not always be done as above.

For example, both a predetermined threshold value $G_{TH1}$ having a negative value and a predetermined threshold value $G_{TH2}$ having a positive value may be set. If the impact acceleration G has the negative value, it may be decided whether or not the impact acceleration G is smaller than the predetermined threshold value $G_{TH1}$, i. e., is larger to the negative side. In contrast, if the impact acceleration G has the positive value, it may be decided whether or not the impact acceleration G is larger than the predetermined threshold value $G_{TH2}$. In this case, if it has been decided that the impact acceleration G is larger to the negative side, or the impact acceleration G is larger than the predetermined threshold value $G_{TH2}$, the process may advance to step 126 in FIG. 2. In other cases, like the case in step 124 in FIG. 2, the process may return to step 102.

In the above explanation, in the premise that the program for executing the start control shown in FIG. 2 is stored previously in the ROM 3, the above start control has been explained. However, the program is not always stored in the ROM 3. For example, the program may be stored in a memory area of the central processing unit 4.

In addition, the program is stored in the well known recording medium, and then the program may be read from the recording medium to input into the central processing unit 4 in execution of the start control. As such recording medium, there are a magnetic recording medium such as a floppy disk, a hard disk, a magnetic tape, etc., for example, an optical disk, and the like. It is needless to say that, of course, if such recording medium is employed, a reading device (a floppy disk drive, a hard disk drive, etc.) to read them is required.

Figure 4:
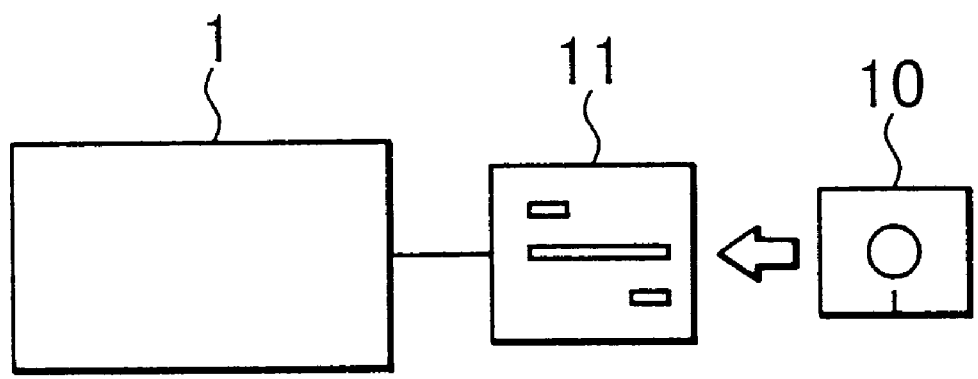
FIG. 4 is a view showing an example of a configuration if a floppy disk is employed to read a program.

An example of a configuration if a floppy disk 10 is employed as the recording medium for the program is shown in FIG. 4. Reading of the program in case the floppy disk 10 is employed as the recording medium will be explained with reference to FIG. 4 hereinbelow.

A floppy disk drive 11 is connected to the central processing unit 4. The program is stored in the floppy disk 10 in advance. The program can be read out from the floppy disk 10 by operating the floppy disk drive 11 and then written into the central processing unit 4. In this state, the program is ready for execution.

As described above, according to the present invention, because the configuration which does not decide erroneously the so-called impact acceleration, which is generated by the cause other than the clash and has the magnitude similar to that of the clash, as the clash can be accomplished, false decision which is caused especially by the resonance of floor, etc. of the vehicle due to the cause except the clash or the so-called seat slide can be avoided without fail, and thus reliability of the passenger protection system can be improved.

In particular, in case a plurality of ECUs of the side air bag system are provided at one location (so-called single point arrangement), generation the impact acceleration caused by the resonance of floor, etc. of the vehicle due to the cause except the clash or the seat slide can be decided as the simple impact acceleration not to create the false decision. As a result, the single point arrangement of the ECU of the side air bag system can be implemented.

What is claimed is:

1. A start controlling method of controlling start of a passenger protection system which is constructed to start a protection system which protects a passenger in a vehicle in response to a start signal applied externally, comprising the steps of:

executing a time integration of an impact acceleration being detected;

deciding whether or not a time integral value of the impact acceleration exceeds a first predetermined value;

deciding whether or not an impact acceleration which exceeds a second predetermined value is detected within a predetermined time when it has been decided that the time integral value of the impact acceleration exceeds the first predetermined value; and disabling start of the passenger protection system if it has been decided by execution of above step that the impact acceleration exceeds the second predetermined value within the predetermined time, while executing the start of the passenger protection system if it has been decided by execution of above step that the impact acceleration does not exceed the second predetermined value within the predetermined time.

2. A start controlling system for controlling start of a passenger protection system which is constructed to start a protection system for protecting a passenger in a vehicle in response to a start signal applied externally, comprising:

an integrating means for calculating a time integral value of a impact acceleration being input externally;

an integral value deciding means for deciding whether or not the value calculated by the integrating means exceeds a first predetermined value;

a clash deciding means for deciding whether or not an impact acceleration which exceeds a second predetermined value is detected within a predetermined time when it has been decided by the integral value deciding means that the value calculated by the integrating means exceeds the first predetermined value; and a start signal generating means for generating a start signal to the passenger protection system if it has been decided by the clash deciding means that the impact acceleration does not exceed the second predetermined value within the predetermined time, while disabling generation of the start signal to the passenger protection system if it has been decided by the clash deciding means that the impact acceleration exceeds the second predetermined value within the predetermined time.

3. A start controlling system for controlling start of a passenger protection system which is constructed to start a protection system for protecting a passenger in a vehicle in response to a start signal applied externally, comprising:

a first interface portion for converting an output of an acceleration sensor into a predetermined signal format;

a first storing portion for storing a program to control start of the passenger protection system;

a central processing unit for executing the program being stored in the first storing portion, the central processing unit
calculates a time integral value of an impact acceleration being input via the first interface portion,
then decides whether or not the time integral value of the impact acceleration being calculated exceeds a first predetermined value,
then decides whether or not the impact acceleration which exceeds a second predetermined value is detected within a predetermined time when it has been decided that the time integral value of the impact acceleration exceeds the first predetermined value, and
then generates a start signal to the passenger protection system when it has been decided that the impact acceleration which exceeds the second predetermined value is not detected, while disables the start signal to the passenger protection system when it has been decided that the impact acceleration which exceeds the second predetermined value is detected; and a second interface portion for converting the start signal to the passenger protection system, which is output from the central processing unit, into a predetermined signal format which can be input into the passenger protection system, and then outputting it.

4. A start controlling system according to claim 3, wherein the first predetermined value is at a level of the time integral value of the impact acceleration which decides that the passenger protection system must be started.

5. A start controlling system according to claim 3, wherein decision whether or not the time integral value of the impact acceleration exceeds the first predetermined value is made by using respective absolute values, then it is decided that the time integral value of the impact acceleration exceeds the first predetermined value if the absolute value of the time integral value of the impact acceleration becomes larger than the absolute value of the first predetermined value, the second predetermined value has the positive polarity, and a sign of the second predetermined value is inverted if the time integral value of the impact acceleration to be compared with the first predetermined value has a positive value, and it is decided that the impact acceleration which exceeds the second predetermined value is detected if the impact acceleration which is larger than the second predetermined value whose sign is inverted is detected.

6. A start controlling system according to claim 4, wherein decision whether or not the time integral value of the impact acceleration exceeds the first predetermined value is made by using respective absolute values, then it is decided that the time integral value of the impact acceleration exceeds the first predetermined value if the absolute value of the time integral value of the impact acceleration becomes larger than the absolute value of the first predetermined value, the second predetermined value has the positive polarity, and a sign of the second predetermined value is inverted if the time integral value of the impact acceleration to be compared with the first predetermined value has a positive value, and it is decided that the impact acceleration which exceeds the second predetermined value is detected if the impact acceleration which is larger than the second predetermined value whose sign is inverted is detected.

7. A recording medium for recording a plurality of computer-readable instructions, comprising:

a first instruction means for causing a computer to execute time integration of an impact acceration which is input into the computer;

a second instruction means for causing a computer to decide whether or not a time integral value of the impact acceleration exceeds a first predetermined value;

a third instruction means for causing a computer to decide whether or not an impact acceleration which exceeds a second predetermined value is detected within a predetermined time when it has been decided that the time integral value of the impact acceleration exceeds the first predetermined value; and a fourth instruction means for causing a computer to disable start of the passenger protection system if it has been decided by execution of above step that the impact acceleration exceeds the second predetermined value within the predetermined time, while to execute the start of the passenger protection system if it has been decided by execution of above step that the impact acceleration does not exceed the second predetermined value within the predetermined time.

* * * * *